US012265566B2

(12) United States Patent
Madnani (10) Patent No.: US 12,265,566 B2
(45) Date of Patent: Apr. 1, 2025

(54) CREATING CONTEXTUAL PROMPTS BASED ON EMBEDDINGS TO ENRICH USER TEXT

(71) Applicant: INTUIT INC., Mountain View, CA (US)

(72) Inventor: Mayur Madnani, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/365,153

(22) Filed: Aug. 3, 2023

(65) Prior Publication Data

US 2025/0045314 A1    Feb. 6, 2025

(51) Int. Cl.
*G06F 16/33* (2019.01)
*G06F 16/3329* (2025.01)
*G06F 16/334* (2025.01)

(52) U.S. Cl.
CPC ...... *G06F 16/3344* (2019.01); *G06F 16/3329* (2019.01); *G06F 16/3347* (2019.01)

(58) Field of Classification Search
CPC .................................................. G06F 16/3344
See application file for complete search history.

(56) References Cited

U.S. PATENT DOCUMENTS

| 11,038,974 B1* | 6/2021 | Koukoumidis ........... H04L 5/02 |
| 2021/0182489 A1* | 6/2021 | Barkan ..................... G06N 3/08 |
| 2021/0224275 A1* | 7/2021 | Maheshwari ........... G06N 3/044 |
| 2024/0070489 A1* | 2/2024 | Dang ....................... G06N 5/04 |

\* cited by examiner

*Primary Examiner* — Van H Oberly
(74) *Attorney, Agent, or Firm* — DLA PIPER LLP US (57) ABSTRACT

Systems and methods for enriching raw user text with a database to identify relevant context, wherein generated prompts provide responses to user queries is provided. A method includes receiving a query, wherein the query comprises the raw text, creating a first embedding based on the query, retrieving a plurality of other embeddings, wherein the plurality of other embeddings are complementary to the first embedding, creating a contextual prompt including context from at least one of the plurality of other embeddings, processing the contextual prompt using a trained machine learning model, thereby generating a response to the query, and causing the response to be displayed by a display device.

18 Claims, 4 Drawing Sheets

CREATING CONTEXTUAL PROMPTS BASED ON EMBEDDINGS TO ENRICH USER TEXT

TECHNICAL FIELD

Embodiments disclosed herein generally relate to systems and methods for enriching raw user text with a database to identify and enrich with relevant context, wherein generated prompts provide responses to user queries.

BACKGROUND

Natural language processing (NLP) refers to machine learning technology that gives computers the ability to interpret, manipulate, and comprehend human language. In particular, NLP may assist computers in processing and analyzing large amounts of natural language data. NLP may be difficult due to the hundreds of natural languages, where each has different syntax rules. Words can be ambiguous when the meaning of the word is dependent on its context. Therefore, one problem associated with NLP is generating accurate and relevant responses.

A large language model (LLM) may be a type of artificial intelligence (AI) or machine learning (ML) algorithm that uses deep learning techniques and massively large data sets to understand, summarize, generate and predict new content. Using an LLM, a computer can provide a non-deterministic response to a user's input. It is a technical problem for an LLM to understand the context and intent behind a user's query or input because the context and intent are useful in formulating a response. Without such context and intent, the response to the query may not have the latest information provided.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The present disclosure is directed to systems and methods for enriching raw user text with a database to identify and enrich with relevant context, wherein generated prompts provide responses to user queries. As described in detail below, LLMs can be enriched with data from an embedding database, giving context to the LLM that enables the LLM to provide accurate responses to user inputs even when the LLM's training data is out of date.

As previously noted, responses to user queries do not always generate the best response as the content and intent behind the query is not always understood. A LLM may be trained at specific time intervals, which means any contextual information that has arisen since the most recent training may not be included. In NLP applications, the generated responses may not be relevant or accurate due to the lack of contextual information. Due to irrelevant or inaccurate responses, this may lead to a poor user experience and dissatisfaction with the application or system, in addition to data errors and other technical problems.

To provide more accurate and relevant responses, an embedding database may be used to enrich the raw user text and use similarity metrics to identify relevant context. By using the latest and most contextual information, the generated prompts may provide more accurate and useful responses to a user's query. This accuracy may enhance the user experience within the application or system as the responses are what the user is expecting or looking for. LLMs trained on older data may be used with contextual prompts and provide the latest information accurately, without retraining the LLMs on newer data. Furthermore, the disclosed systems and methods can improve LLM accuracy without requiring retraining to do so, which can greatly improve computational efficiency, reduce downtime, and improve performance in a technical sense. Additionally, private data will not be exposed in the process.

Figure 1:
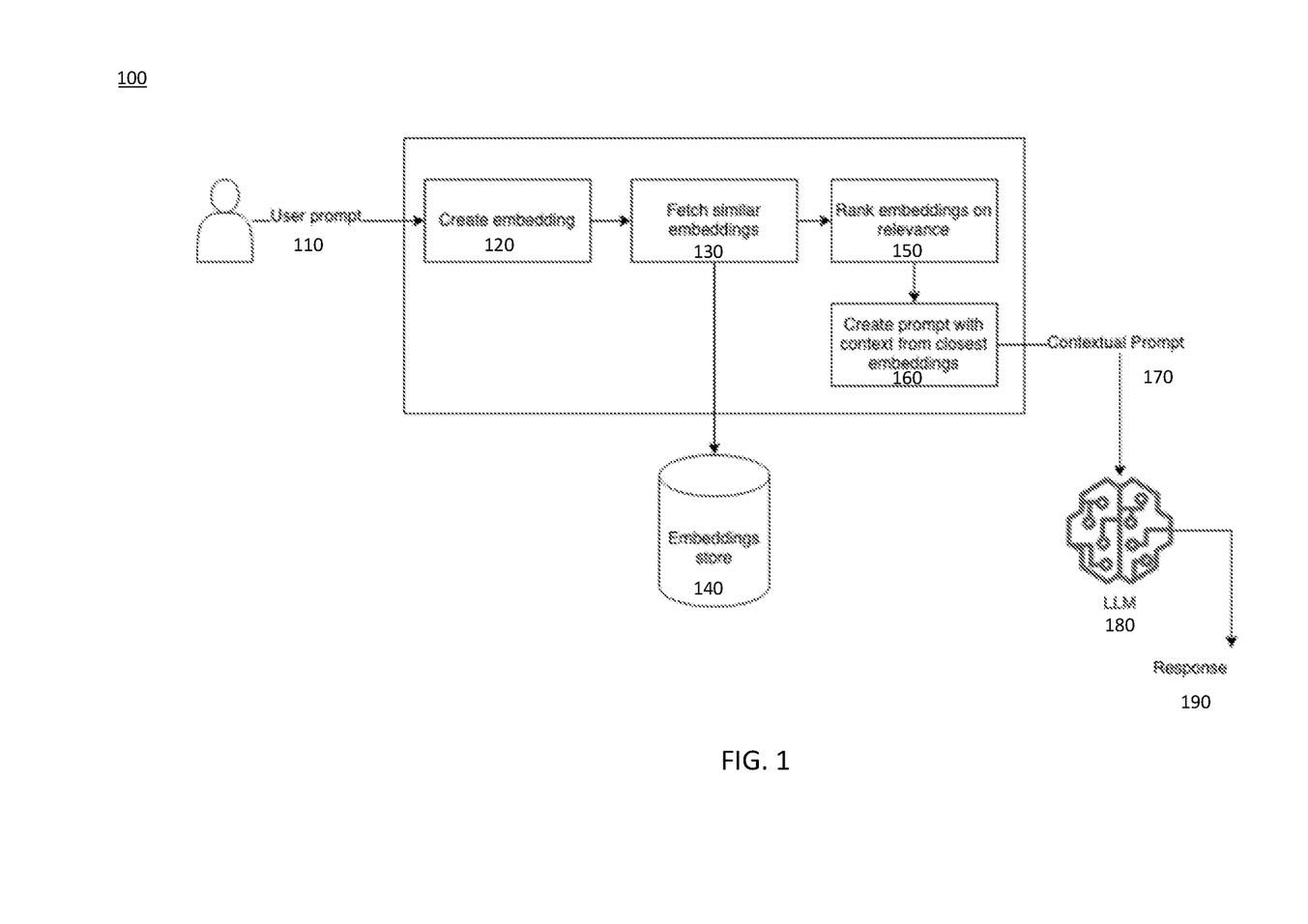
FIG. 1 illustrates a process for enriching raw user text, according to an embodiment of the present disclosure.

FIG. 1 illustrates a process 100 for enriching raw user text, according to an embodiment. In some embodiments, the process 100 may include, but is not limited to, a user entering a query, a server creating an embedding, the server fetching similar embeddings, the server ranking the embeddings, the server creating a contextual prompt, inputting the contextual prompt into an LLM, and the LLM processing the contextual prompt to generate a response to the query.

In step 110, a user may enter a prompt, which also may be referred to as a query. For example, the user may be using a client device such as a personal computer, smartphone, tablet, etc. The client device may present a user interface (UI) including a field for entering the prompt or query. The user may enter information into the field, for example a question they would like to have answered by the LLM. The query may be sent to a server or the like, as described in detail below. Through process 100, one or a plurality of responses may be provided.

In step 120, the server may create an embedding after the user makes a query in step 110. Here, an embedding may refer to a representation of the sentence in NLP. The representation of the prompt, or query, may be a vector that encodes the meaning of the sentence such that words that are closer in the vector space are similar in meaning. The embedding may be created using NLP algorithms known to those of ordinary skill in the art and/or novel NLP algorithms. The embeddings may be of fixed size that is capable of representing words in a specified fixed sized vector dimensions, in some embodiments.

In step 130, the server may fetch similar embeddings, once the embedding is created in step 120. The similar embeddings may be taken from the embeddings store 140. The embeddings store 140 is a database capable of storing queries, responses, prompts, embeddings, or the like. The embeddings store 140 may be continuously updated over time based on the queries being received in step 110.

In step 150, the server may rank the embeddings based on their relevance once similar embeddings are found in step 130. The rankings in step 150 may include a n-dimensional vector. The rankings may be based on how similar two embeddings are. To determine the similarity, the n-dimensional vectors may be used with vector similarity algorithms. For example, cosine similarity may measure the similarity between two vectors of an inner product space.

The system can measure the cosine of the angle between two vectors and determine whether the two vectors are pointing in roughly the same direction, which can indicate similarity. Vector similarity algorithms may be used to measure document similarity in text analysis.

At any given time, some responses to the query may be empty or may not have any content. That is, the response to the query may be "I don't know" or a similar canned response because the embeddings store 140 does not have enough information to answer the query. Specific examples of responses are described with reference to FIG. 2. In these cases, a contextual prompt 170 may be provided.

In step 160, the server may create a new prompt, referred to as a contextual prompt 170, with context from the closest embeddings in step 160 added to the user prompt 110. The closest embedding in step 160 refers to the distance for similar prompts in the vector space. A cosine function in the vector space may be used to find the closest distance.

The server may give the contextual prompt 170 as an input to an LLM 180. The LLM 180 may process the contextual prompt 170 and generate a response 190. Using a contextual prompt 170 as opposed to the original user prompt or query provides more accurate and helpful response to a user's queries. The contextual prompt 170 is more relevant than the original prompt, as the original prompt may have no context. Specifically, a user may ask any question and may receive an ambiguous answer. But by using the process 100 as described in FIG. 1, the ambiguity may be replaced with clear context that enables the LLM 180 to provide a relevant answer without retraining.

Although the above process 100 refers to using a LLM 180, any ML model may be used such as support vector machines, Bayesian networks, maximum entropy, conditional random field, neural networks, or the like. A LLM 180 is merely used for illustrative purposes. Examples of LLMs 180 are generative pre-trained transformer 3 (GPT-3), bidirectional encoder representations from transformers (BERT), permutation language modeling (XLNet), text-to-text transformations (T5), or the like.

Figure 2:
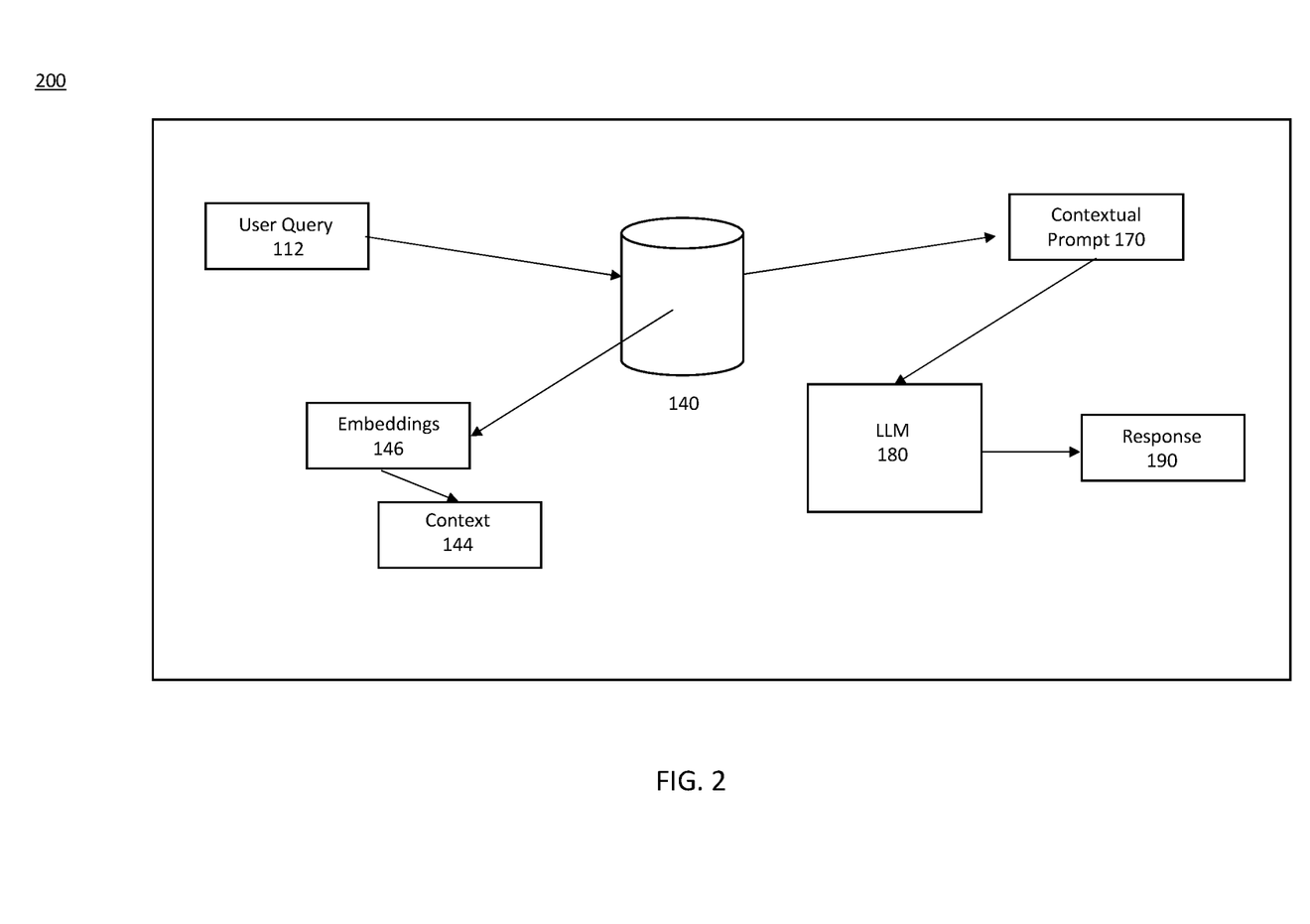
FIG. 2 illustrates a server for enriching raw user text, according to an embodiment of the present disclosure.

FIG. 2 illustrates a server 200 that enriches raw user text, according to an embodiment.

Within the server 200, an embeddings store 140 is provided. The embeddings store 140 may receive and generate, for example, embeddings 146 or contextual prompts 170. A user query 112, which may contain raw user text, may be provided to the embeddings store 140 so that the raw user text may be enriched by the contextual prompt 170. The contextual prompt may receive context 144, which may be generated by an embedding 146. The embedding 146 may be stored as a data structure, which may be used for vector operations later, in the embeddings store 140. The contextual prompt 170 may be used as an input in an LLM 180. After the LLM 180 processes the contextual prompt 170, a response 190 to the user query 112 may be generated.

Fashion, for example, is a query topic that a user may be interested in and make a query 112 in the server 200. Fashion is constantly changing, which implies the embeddings store 140 would be constantly updated with new fashion queries 112 and context 144. For example, a fashion query 112 may be about "red glossy rings," "cargo pants," "sheer clothing," "denim reimagined," or "shine in the daytime." The examples described herein are related to fashion, but the disclosed embodiments are not limited to fashion, and other topics may be used for the queries.

The embeddings store 140 may have multiple data structures, represented in vector dimensions, that contain text, or context 144, relating to fashion. Within each text related to fashion is the embedding location and the distance to it in vector space. The text related to fashion may be, for example, web scraped to gather such information.

For example, the query 112 in fashion that a user may be interested in is "what are some clothing trends in red color?" This may be the original query 112. Once the query 112 has gone thru the process 100 described in FIG. 1, a context 144 may be provided to the embeddings store 140. The context 144, for example, may be "2023 Fashion Trend: Red. Glossy red hues took over the Fall 2023 runways ranging from Sandy Liang and PatBo to Tory Burch and Wiederhoeft. Think: Juicy reds with vibrant orange undertones that would look just as good in head-to-toe looks (see: a pantsuit) as accent accessory pieces (shoes, handbags, jewelry)."

Based on the context 144, the embeddings store 140 finds similar embeddings 146. The embeddings store 140 may then sort the similar embeddings 146 by relevance. The embeddings store 140 may then create a contextual prompt 170 from the closest embedding 146. Here, the closest embedding 146 is the embedding 146 with the shortest distance for similar queries. The context 144 may be added, which enriches the query 112 with the closest embeddings 146. The query 112 here is kept short and the context 144 may be added by enriching the query 112 with the closest embeddings 146.

Specifically, the query 112 may be converted to embedding 146 in step 120. The similarity search, as in step 130, occurs with embeddings 146 generated from the query 112. The embedding 146 is specific to fashion and has vector representation of certain words such as clothing, trends, red, color, or the like. The similar match would identify embeddings 146 vector search using a similarity algorithm. The similarity algorithm may be based on, for example, cosine distance, or the like.

In some embodiments, the query 112 may not be able to be answered based on the context 144 provided. In such instances, the response 190 may be "I don't know" or a similar canned response. However, if the query 112 can be answered based on the context 144 provided, the response 190 may be detailed and specific to the query, for example "Some clothes trends in red color include bold color bottoms, sheer clothing, ruby slippers, and denim reimagined."

Another fashion example may be used to understand the multiple query responses 190 provided to a query 112 with and without context 144. For example, the query 112 from the user may be "What are the top three men's trends in 2023?"

The context 144 provided to enrich such a query 112 may be one of contexts 144 such as "Bold and vibrant colors-Bright, vibrant colors are expected to dominate men's fashion trends in 2023, with shades such as fuchsia, teal, and orange being particularly popular," referred to as c1, "Sustainable materials-More conscious consumption habits will continue to grow as an expectation in 2023, resulting in the use of materials such as hemp, organic cotton, and bamboo becoming increasingly popular in men's fashion," referred to as c2, and "Retro-inspired silhouettes-Figure-hugging and vintage cuts such as bell bottoms and boleros, will continue to be strong trends heading into 2023," referred to as c3, The response 190 to the query 112 for top men's trends, which now has the added context 144, referred to as c1, c2, or c3, may be "cargo pants, pinstripe tailoring, and tailored look." Without the context 144 provided above as c1-c3, the response 190 would not be able to provide the exact men's trends. That is, the LLM 180 has not been trained on the newer contexts 144 or user queries 112. However, with additional context 144, the LLM 180 may provide the exact men's trends—that is the LLM 180 may use the context 144 of the latest data to provide the response 190.

Moreover, the server 200 may give only context 144 to a query 112, which may be sorted by relevance, such as only one of c1-c3. However, if the query 112 requests for the top three fashion trends, for example, c1-c3 may all be given.

By using contextual prompts 170, the LLM 180 may provide responses 190 with context 144 of the latest data using the LLM 180 that is trained on older data, i.e., older fashion trends. The LLM 180 is not trained in real-time, but the latest data may be used to enrich the queries 112 and provide the response 190 using the context 144 of the new data. The LLM 180 may be trained on older data but may provide responses 190 with the context 144 of the latest data without the need of retraining.

Figure 3:
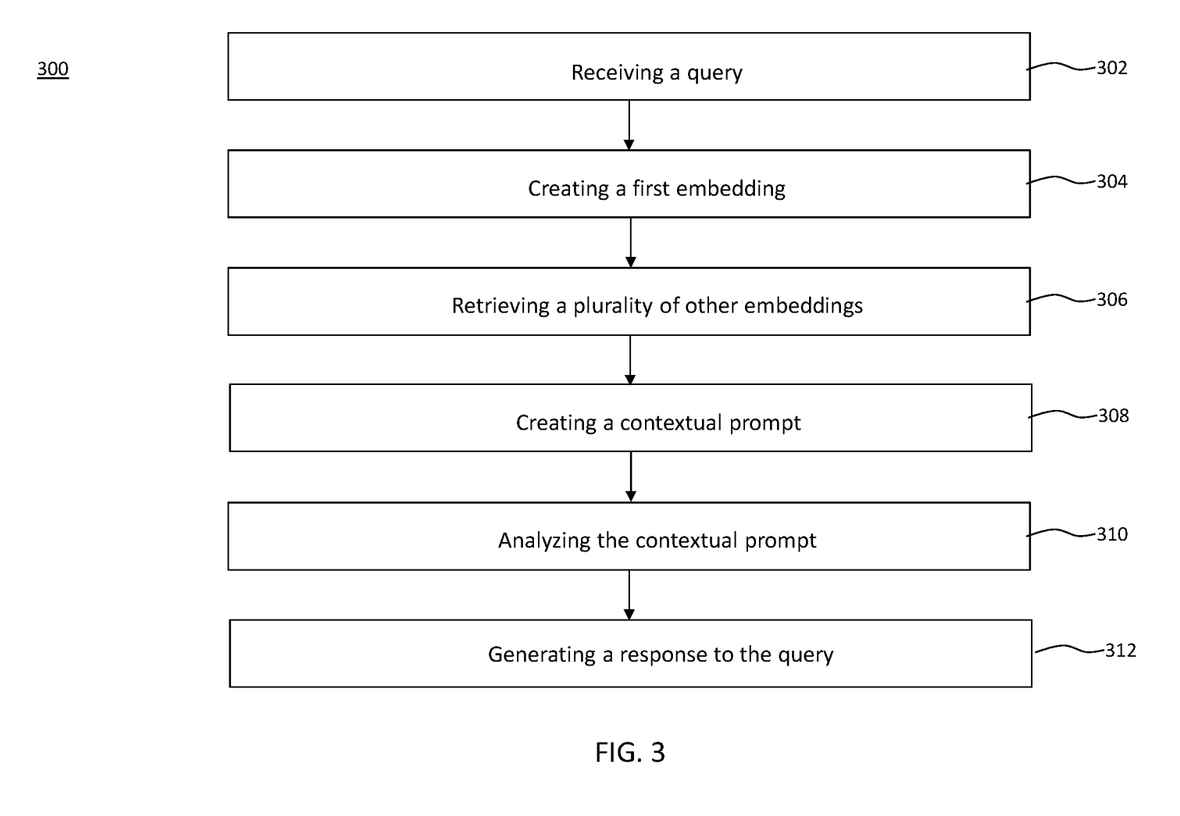
FIG. 3 is a flowchart for a method for enriching raw user text, according to an embodiment of the present disclosure.

As noted above, FIG. 1 describes a process 100 for enriching raw text of a query to generate a response with context. FIG. 2 further described how a server 200 may be used to do such a process 100. FIG. 3 further describes a method 300 that may be used for performing such a process 100 of enriching raw text.

FIG. 3 is a flowchart for a method 300 for enriching raw user text, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 3, as will be understood by a person of ordinary skill in the art.

Method 300 shall be described with reference to FIGS. 1-2. However, method 300 is not limited to that example embodiment.

In 302, a query may be received. The query may include raw user text. For example, a query 112 may be received by a server 200. As a specific example, a query 112 may be a question about the latest fashion trend. The query 112 may be "what is the top fashion trend for summer of 2023?"

In 304, a first embedding may be created based on the query. The first embedding may be stored in an embeddings store. The embeddings store may be a database. For example, an embedding 146 may be created based on the query 112. The embedding 146 may be stored in an embeddings store 140. For example, an embedding 146 may include vector representation of the text about the latest fashion trends such as popular colors, materials being used, or silhouettes in summer of 2023.

In 306, a plurality of other embeddings may be retrieved. The plurality of other embeddings may be similar to the first embedding. The plurality of other embeddings may be ranked based on a relevance to the query. The plurality of other embeddings may be stored in an embeddings store. The embeddings store may be a database. For example, a plurality of embeddings 146 may be retrieved that are similar to the original embedding, as in step 130. The embeddings 146 may be ranked on relevance, as in step 150. The embedding 146 may be stored in an embeddings store 140. For example, the embeddings 146 may be ranked based on relevance. The fashion trends popular colors, materials being used in summer of 2023, or silhouettes may be ranked.

In 308, a contextual prompt may be created based on context from at least one of the plurality of other embeddings. The at least one of the plurality of other embeddings may have the shortest distance to the contextual prompt. The shortest distance may be determined using vector space. For example, a contextual prompt 170 may be created based on the context 144 of the embeddings 146. The embeddings 146 may have the shortest distance to the contextual prompt 170, as in step 160. For example, the contextual prompt 170 may include text about the most relevant fashion trends of summer 2023 such as bold and vibrant colors, sustainable materials, or retro-inspired silhouettes. That is, the contextual prompt 170 may include text regarding orange, green, and yellow as the bold and vibrant colors of summer 2023, sustainable materials for summer 2023 such as bamboo or hemp, and retro silhouettes such as bell-bottoms.

In 310, the contextual prompt may be analyzed using a trained machine learning model. The trained machine learning model may be a large language model. For example, the contextual prompt 170 may be analyzed using the LLM 180. Specifically, the contextual prompt 170 may include text about the most relevant fashion trends such as bold and vibrant colors, sustainable materials, or retro-inspired silhouettes and may be put into the LLM 180.

In 312, a response may be generated, where the response may be based on the contextual prompt. For example, the response 190 may be generated. The response 190 is based on the contextual prompt 170. As a specific example, the response for a query 112 about fashion trends may include the most relevant fashion trends such as cargo pants, culottes, or pinstripe tailoring for summer of 2023.

Figure 4:
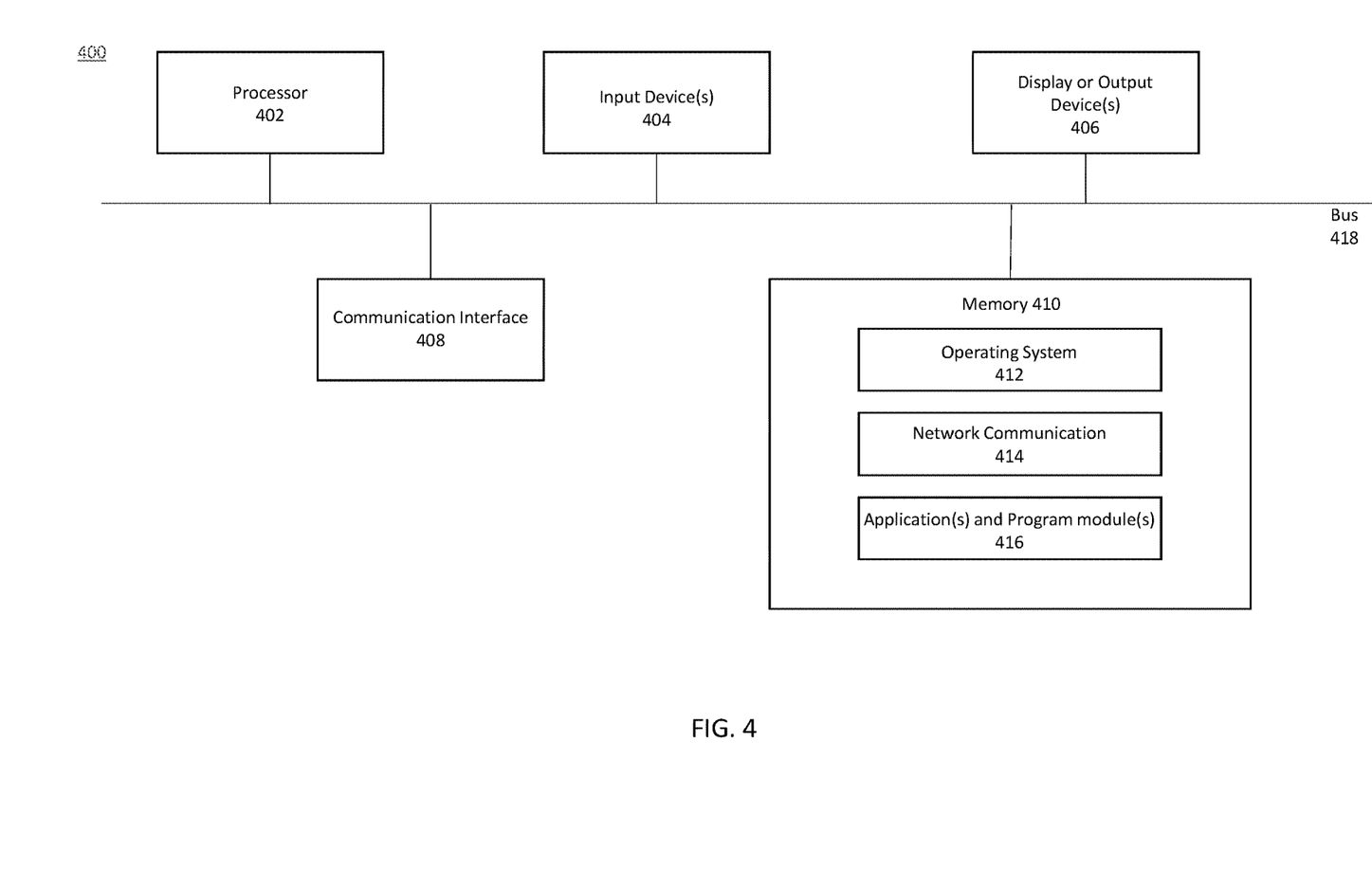
FIG. 4 illustrates an example computer system useful for implementing various embodiments, according to an embodiment of the present disclosure.

FIG. 4 is a block diagram of an example computing device 400 that may be utilized to execute embodiments to implement processes including various features and functional operations as described herein. For example, computing device 400 may function for enriching raw user text with a database to identify relevant context, wherein generated prompts provide responses to user queries. or a portion or combination thereof.

The computing device 400 may be implemented on any electronic device to execute software applications derived from program instructions for and as illustrated in FIGS. 1-2, and includes but not limited to personal computers, servers, smartphones, media players, electronic tablets, game consoles, email devices, etc. In some implementations, the computing device 400 may include one or more processors 402, one or more input devices 404, one or more display devices or output devices 406, one or more communication interfaces 408, and memory 410. Each of these components may be coupled by bus 418, or in the case of distributed computer systems, one or more of these components may be located remotely and accessed via a network.

Processor(s) 402 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 404 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 406 such as a CRT (cathode ray tube) or LCD (liquid crystal display) monitor for displaying information to the user and a keyboard and a pointing device such as a mouse or a trackball by which the user can provide input to the computer. Display device 406 may be any known display technology, including but not limited to display devices using Liquid Crystal Display (LCD) or Light Emitting Diode (LED) technology.

Communication interfaces 408 may be configured to enable computing device 400 to communicate with other another computing or network device across a network, such as via a wired connection, a wireless connection, or a combination of wired and wireless connections. 3For example, communication interfaces 408 may include an Ethernet interface, an optical interface, a coaxial interface, an infrared interface, a radio frequency (RF) interface, a universal serial bus (USB) interface, a Wi-Fi interface, a cellular network interface, or the like.

Memory 410 may be any computer-readable medium that participates in providing computer program instructions and data to processor(s) 402 for execution, including without limitation, non-transitory computer-readable storage media (e.g., optical disks, magnetic disks, flash drives, etc.), or volatile media (e.g., SDRAM, ROM, etc.). Memory 410 may include various instructions for implementing an operating system 412 (e.g., Mac OS®, Windows®, Linux). The operating system may be multi-user, multiprocessing, multitasking, multithreading, real-time, and the like. The operating system may perform basic tasks, including but not limited to: recognizing inputs from input devices 404; sending output to display device 406; keeping track of files and directories on memory 410; controlling peripheral devices (e.g., disk drives, printers, etc.) which can be controlled directly or through an I/O controller; and managing traffic on bus 418. Bus 418 may be any known internal or external bus technology, including but not limited to ISA, EISA, PCI, PCI Express, USB, Serial ATA or FireWire.

Network communications instructions 414 may establish and maintain network connections (e.g., software applications for implementing communication protocols, such as TCP/IP, HTTP, Ethernet, telephony, etc.). Application(s) and program modules 416 may include software application(s) and different functional program modules which are executed by processor(s) 402 to implement the processes described herein and/or other processes. For example, the program modules 416 may include a service management module for retrieving features associated with user transactions described herein for accessing program components and application processes. The program modules 416 may include but not limited to software programs, machine learning models, objects, components, data structures that are configured to perform tasks or implement the processes described herein. The processes described herein may also be implemented in operating system 412.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user computing device and server may generally be remote from each other and may typically interact through a network. The relationship of user computing devices and application server may arise by virtue of computer programs running on the respective computers and having a client-server relationship to each other.

Communication between various network and computing devices 400 of a computing system may be facilitated by one or more application programming interfaces (APIs). APIs of system may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. One or more features and functional operations described in the disclosed embodiments may be implemented using an API. An API may define one or more parameters that are passed between an application and other software instructions/code (e.g., an operating system, library routine, function) that provides a service, which provides data, or that performs an operation or a computation. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments can be used, and other changes can be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

Various of the above-disclosed and other features and functions, or alternatives thereof, can be combined into many other different systems or applications. Various presently unforeseen or unanticipated alternatives, modifications, variations or improvements therein can be subsequently made by those skilled in the art, each of which is also intended to be encompassed by the disclosed embodiments.

As used in this document, the singular forms "a," "an," and "the" include plural references unless the context clearly dictates otherwise. With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells as well as the range of values greater than or equal to 1 cell and less than or equal to 3 cells. Similarly, a group having 1-5 cells refers to groups having 1, 2, 3, 4, or 5 cells, as well as the range of values greater than or equal to 1 cell and less than or equal to 5 cells, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

By hereby reserving the right to proviso out or exclude any individual members of any such group, including any sub-ranges or combinations of sub-ranges within the group, which can be claimed according to a range or in any similar manner, less than the full measure of this disclosure can be claimed for any reason. Further, by hereby reserving the right to proviso out or exclude any individual substituents, structures, or groups thereof, or any members of a claimed group, less than the full measure of this disclosure can be claimed for any reason.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $1/10$ of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art. Where the context of the disclosure indicates otherwise, or is inconsistent with such an interpretation, the above-stated interpretation can be modified as would be readily apparent to a person skilled in the art. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). Further, the transitional term "comprising," which is synonymous with "including," "containing," or "characterized by," is inclusive or open-ended and does not exclude additional, unrecited elements or method steps. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

The term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

Throughout this disclosure, various patents, patent applications and publications can be referenced. The disclosures of these patents, patent applications and publications are incorporated into this disclosure by reference in their entireties in order to more fully describe the state of the art as known to those skilled therein as of the date of this disclosure. This disclosure will govern in the instance that there is any inconsistency between the patents, patent applications and publications cited and this disclosure.

The invention claimed is:

1. A computer-implemented method comprising:
  receiving, by at least one processor, a query, wherein the query comprises raw text;
  creating, by the at least one processor, a first embedding based on the query wherein the embedding comprises a vector representation of the raw text;
  retrieving, by the at least one processor, a plurality of other embeddings, wherein the plurality of other embeddings are vectors complementary to the vector of the first embedding, and the vectors of the plurality of other embeddings encode context;
  ranking, by the at least one processor, the plurality of other embeddings based on a relevance to the query determined by a vector similarity algorithm measuring the similarity between the other embeddings and the first embedding in a vector space;
  creating, by the at least one processor, a contextual prompt comprising the raw text of the query and the context from at least a highest ranked one of the plurality of other embeddings;
  querying, by the at least one processor, a large language model (LLM) trained on a data set different from the context, the querying comprising providing the contextual prompt as a prompt to the LLM, thereby generating a response to the query; and
  causing, by the at least one processor, the response to be displayed by a display device.

2. The method of claim 1, wherein the at least one of the plurality of other embeddings has the shortest distance to the contextual prompt.

3. The method of claim 2, wherein the shortest distance is determined using the vector space.

4. The method of claim 1, wherein the first and the plurality of other embeddings are stored in an embeddings store, wherein the embeddings store is a database.

5. The method of claim 4, wherein the first and the plurality of other embeddings are words in natural language processing.

6. The method of claim 1, wherein the trained machine learning model is a large language model.

7. A system for enriching raw user text, comprising:
  at least one processor; and
  at least one non-transitory computer-readable medium in communication with the at least one processor and storing instructions that, when executed by the at least one processor, cause the at least one processor to perform operations comprising:
  receive a query, wherein the query comprises raw text;
  create a first embedding based on the query wherein the embedding comprises a vector representation of the raw text;
  retrieve a plurality of other embeddings, wherein the plurality of other embeddings are vectors complementary to the vector of the first embedding, and the vectors of the plurality of other embeddings encode context;
  rank the plurality of other embeddings based on a relevance to the query determined by a vector similarity algorithm measuring the similarity between the other embeddings and the first embedding in a vector space;
  create a contextual prompt comprising the raw text of the query and the context from at least a highest ranked one of the plurality of other embeddings;
  query using a large language model (LLM) trained on a data set different from the context, the querying comprising providing the contextual prompt as a prompt to the LLM, to thereby generate a response to the query; and
  cause the response to be displayed by a display device.

8. The system of claim 7, wherein the at least one of the plurality of other embeddings has the shortest distance to the contextual prompt.

9. The system of claim 8, wherein the shortest distance is determined using the vector space.

10. The system of claim 7, wherein the first and the plurality of other embeddings are stored in an embeddings store, wherein the embeddings store is a database.

11. The system of claim 10, wherein the first and the plurality of other embeddings are words in natural language processing.

12. The system of claim 7, wherein the trained machine learning model is a large language model.

13. A non-transitory computer-readable medium in communication with the at least one processor and storing instructions that, when executed by the at least one processor, cause the at least one processor to perform operations comprising:

receiving a query, wherein the query comprises raw text;

creating a first embedding based on the query wherein the embedding comprises a vector representation of the raw text;

retrieving a plurality of other embeddings, wherein the plurality of other embeddings are vectors complementary to the vector of the first embedding, and the vectors of the plurality of other embeddings encode context;

ranking the plurality of other embeddings based on a relevance to the query determined by a vector similarity algorithm measuring the similarity between the other embeddings and the first embedding in a vector space;

creating a contextual prompt comprising the raw text of the query and the context from at least a highest ranked one of the plurality of other embeddings;

querying a large language model (LLM) trained on a data set different from the context, the querying comprising providing the contextual prompt as a prompt to the LLM, thereby generating a response to the query; and     causing the response to be displayed by a display device.

14. The non-transitory computer-readable medium of claim 13, wherein the at least one of the plurality of other embeddings has the shortest distance to the contextual prompt.

15. The non-transitory computer-readable medium of claim 14, wherein the shortest distance is determined using the vector space.

16. The non-transitory computer-readable medium of claim 13, further comprising:

ranking the plurality of other embeddings based on a relevance to the query.

17. The non-transitory computer-readable medium of claim 13, wherein the first and the plurality of other embeddings are stored in an embeddings store, wherein the embedding store is a database.

18. The non-transitory computer-readable medium of claim 13, wherein the trained machine learning model is a large language model.

\* \* \* \* \*